May 25, 1937.   F. R. CANNEY   2,081,529
AIRPLANE SLEEPING BERTH ARRANGEMENT
Filed Jan. 2, 1936   2 Sheets-Sheet 1
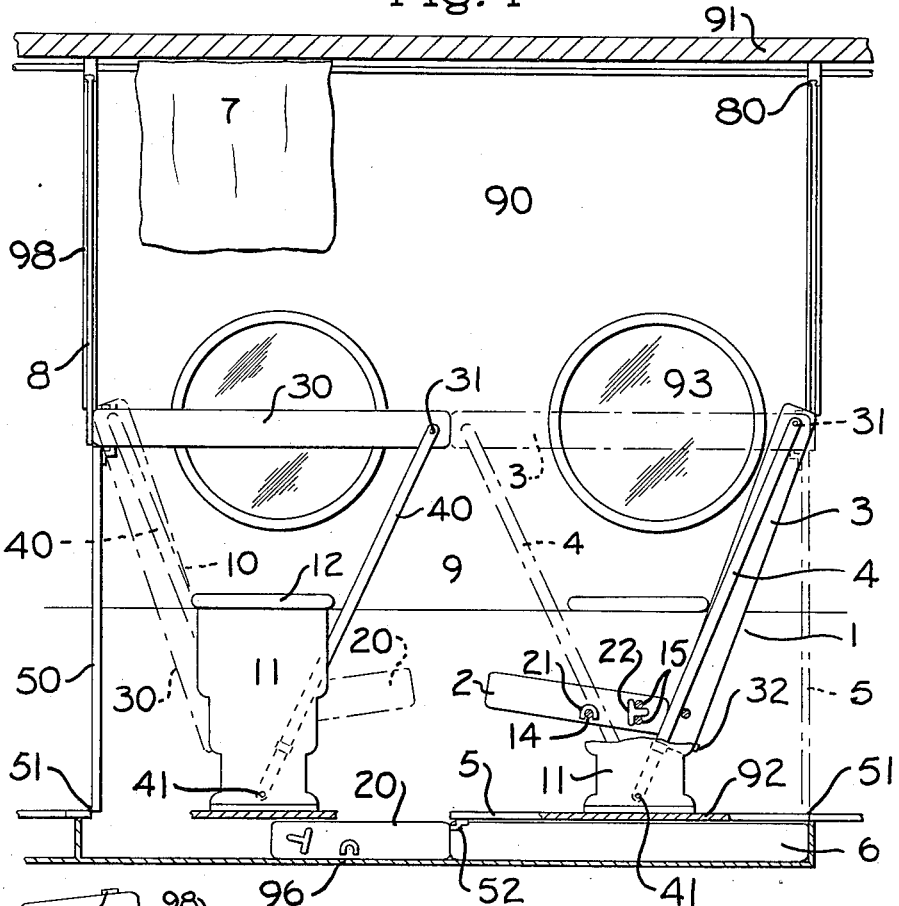
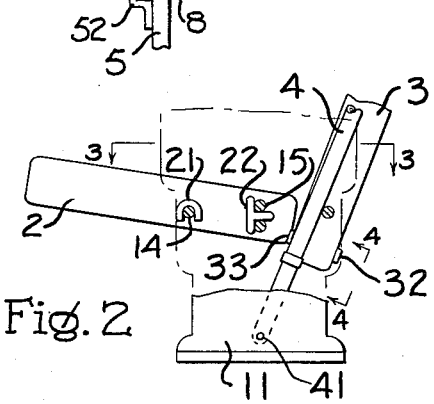
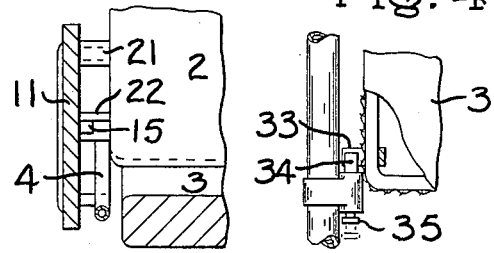
Inventor
Frank R. Canney
By Charles L. Reynolds
Attorney May 25, 1937.　　　F. R. CANNEY　　　2,081,529
AIRPLANE SLEEPING BERTH ARRANGEMENT
Filed Jan. 2, 1936　　　2 Sheets-Sheet 2

Inventor
Frank R. Canney
By
Charles L. Reynolds
Attorney

Patented May 25, 1937

2,081,529

UNITED STATES PATENT OFFICE 2,081,529

AIRPLANE SLEEPING BERTH ARRANGEMENT

Frank R. Canney, Seattle, Wash., assignor to Boeing Aircraft Company, Seattle, Wash., a corporation of Washington Application January 2, 1936, Serial No. 57,146

13 Claims. (Cl. 244—118)

My invention relates to sleeping berths for airplanes. Such berths, because of the limitations of space and weight, must be simple and involve the minimum of weight in addition to that required for seating the passenger, yet for the comfort of the passenger while occupying the seat or while occupying the berth the arrangement must be such as will afford him adequate room, a soft, comfortable seat, and an equally soft, comfortable berth. Moreover, because an airplane is traveling in three dimensions, and may be subjected to momentary drops or rises, due to bumpy air, it must be secure so that there can be no danger of collapse, and it must be braced rigidly against movement in three directions.

It is desirable also, for the comfort and convenience of the passenger, that the seat be reversible, so that he may face forward or rearward, as he may desire.

My invention has for its object the accomplishment of the above ends, and the provision of a strong, rugged berth arrangement wherein upper and lower berths are made up largely of the seat cushions and backs.

My invention comprises the novel arrangement, including the novel seats and the relative arrangement thereof with relation to each other and to airplane cabin parts, as shown in the accompanying drawings and as will be hereafter more fully disclosed and defined.

In the accompanying drawings I have shown my invention embodied in an illustrative form, various details being omitted.

Figure 1 is a longitudinal section through an airplane cabin or a part thereof, showing in elevation the berth partly made up and partly in the form of a seat.

Figure 2 is an elevation of such a seat, with parts broken away and shown in section, illustrating the arrangement of parts when the seat is ready for occupancy as such.

Figure 3 is a detail section on the line 3—3 of Figure 2, further illustrating the same construction, taken on the line 3—3 of Figure 2.

Figure 4 is a view taken substantially on the line 4—4 of Figure 2, illustrating a detail of a releasable lock for the seat back.

Figure 5 is a detail elevation of the interengaging locking means to support the seat back and floor panel in elevated position.

Figure 6:
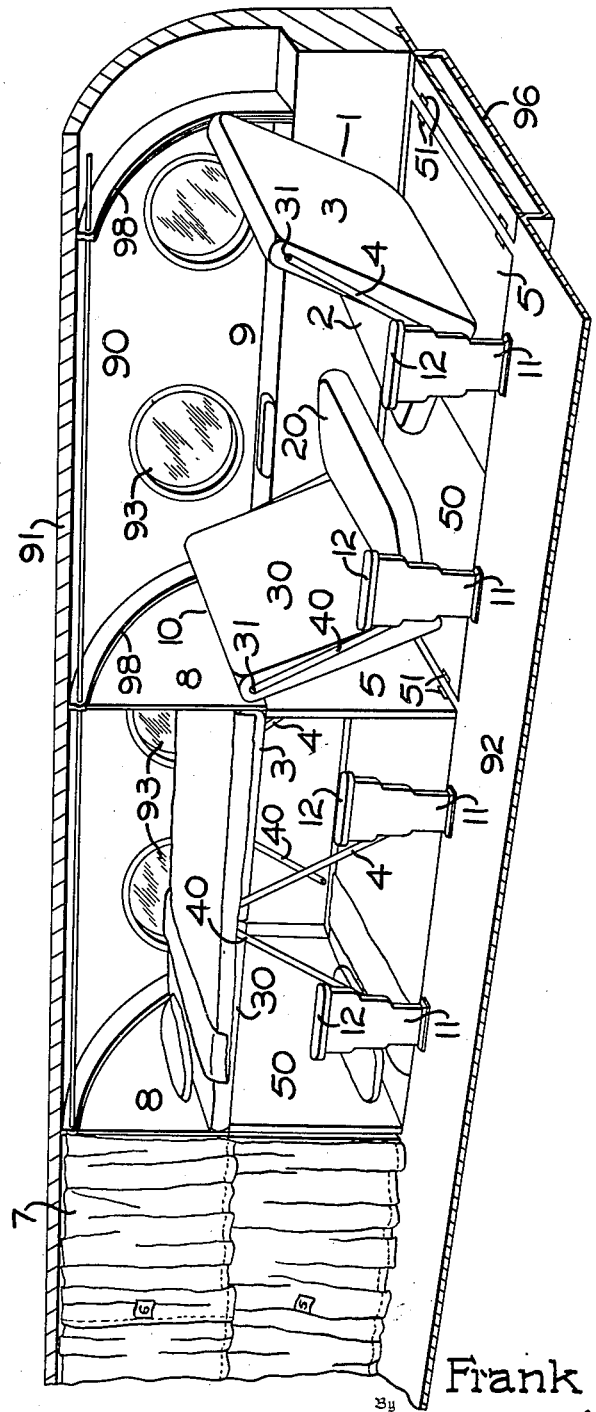
Figure 6 is a perspective section longitudinally of the cabin space, showing such seats and berths.

Large numbers of airplane passenger flights extend into or through the night, and it is desirable that the passengers be permitted to sleep uninterruptedly through the night, if they so desire. Furthermore, large passenger planes, analogous to express trains, may carry sufficient fuel to make long distance flights without intermediate landings, so that there is nothing to disturb the rest of passengers as sometimes occurs during more frequent night landings, with airplanes of shorter cruising radius. Whereas on railway sleeping cars the item of weight is of such minor importance as to be almost wholly inconsiderable, and likewise there is more space available, on airplanes it is of the utmost importance that all possible weight be saved, and because the frontal area of an airplane has a direct influence on the power, fuel consumption, and load carrying capacity generally, it is of great importance that the space be restricted to the minimum consistent with comfort. These considerations render airplane sleeping berth arrangements inherently different from those on railway sleeping cars.

The airplane, of which the berth arrangement shown is a part, is necessarily a comparatively large airplane, and there is illustrated only a portion of the cabin of such an airplane, including the side walls 9, the upper wall 90, which would normally be formed on a curve of large radius merging into the ceiling or upper wall 91, the center aisle or floor 92, and the windows or ports 93.

Each section would normally be made up of two seats, the seats being indicated in general by the numerals 1 and 10 to distinguish them, but each of these seats is or may be identical with the other. Each such seat comprises a seat cushion 2, which is normally entirely removable so that there is left nothing extending from one end to the other of the seat, a seat back 3, and an arm 4. To distinguish them, the corresponding elements of seat 10 are designated 20, 30 and 40, respectively. A standard 11 may be mounted at the outer or aisle end of each seat, to carry an arm rest 12, and for the support at the outer or aisle end of the seat cushion and for the lower ends of the arms 4 and 40.

The arms 4 and 40 are pivotally mounted at 41 at a point distant from the upper edge of the back. As it will be preferable to have this point below rather than above the seat, they are shown pivoted adjacent the floor, and preferably under the corresponding seat cushion, so that the arms 4 normally are inclined upwardly in one direction or the other, depending upon the direction in which the seat is faced, for, as pointed out above, it is preferable that the seats be reversible. The seat back 3, for example, is pivotally supported by its upper end upon the upper end of the arm 4, as indicated at 31, and the lower edge of the seat back is free to swing relatively to the remainder of the seat and with respect to the arm 4, except as it is provided with two spaced stops 32 and 33, with which is engageable a releasable dog 34. The dog 34 is normally spring-held upward in a position between the stops 32 and 33, as may be seen in Figures 2 and 4, but upon withdrawal of the dog 34 by downward movement of its handle 35 the lower edge of the seat back may be released from the dog 34, whereupon the lower edge of the seat back may swing freely.

Any suitable arrangement may be provided for supporting the seat cushion 2 or 20. As shown herein the seat cushion is provided with a downwardly facing socket 21 intermediate its forward and rear edges, and with a T-shaped bracket or fitting 22 adjacent its rear edge, these being engageable with pins 14 and 15, respectively, on the standard 11, and where no standard is provided at the inner or wall side of the seat, upon the wall 9 of the airplane. By these or any equivalent arrangement the seat cushion 2 or 20 may be lifted entirely out of the way and removed, or may be lifted and reversed end for end and edge for edge, being supported in either position at an angle which will be found comfortable. Indeed the pins 14 and 15, or their equivalents, may be mounted for adjustment as to angle and position forwardly and rearwardly.

It will be observed that the seat may be individually reversed, so that either one or both may face forward, or either one or both may face to the rear, or the two seats may face each other or be placed back to back. The normal position for the two seats is facing each other, but the normal position for an individual seat is with the seat and back in position to receive an occupant in sitting posture. In setting up the berths, however, they may be assumed to be arranged facing each other, and the first step is to remove the seat cushions 2 and 20. The arms 4 and 40 are now swung on their pivots 41 to incline them towards each other, with their upper ends closely adjacent. The dog 34 or its equivalent may now be released, so that the lower edge of each seat back may be swung upwardly until, with both seat backs swung upwardly, their upper edges abut, and the seat backs lie in coplanar elevated relationship, to form an upper berth.

Their formerly lower edges must, of course, be held in such position, and suitable means are provided for supporting such edges. These means may very conveniently consist of floor panels 5 and 50, one beneath each seat, preferably with one edge of each abutting the corresponding edge of the other (this depending upon their length), and hinged at their distant edges, as indicated at 51, so that each may be swung upwardly. Each such panel may be provided with a bracket 52 on its swinging edge, which when the floor panel is swung into vertical position, forms a socket to receive the stop 32 or like element of the corresponding seat back, when this seat back is swung somewhat above the level of the upwardly swung edge of the corresponding floor panel, and then lowered to position the stop 32 in this bracket 52, as may be seen in Figure 5. Suitable locking means may be provided (not shown) to retain the parts in this position, and thus supported, the seat backs together constitute an upper berth, which is rigidly supported, yet by parts which constitute necessary portions of the airplane structure. Preferably the upper berth is arranged at a level substantially to bisect the windows 93, so that each of the upper and lower berth spaces is provided with light and an outlook.

The floor panels 5 and 50 would normally enclose a storage and berth space beneath them, in which a half mattress 6 may be normally stored, supported on a false bottom 96 constituting part of the airplane cabin. The seat cushions 2 and 20, when removed, may be dropped into this lower berth space, and with the half mattress 6 they will constitute the lower berth. Curtains, a part of which is indicated at 7, may likewise be stored in this space, as may partitions 8, to be later decribed. While the aisle level 92 is shown flush with the floor panels 5, it will be evident that the aisle or walkway may be disposed at a different level, for instance below the level of the floor panels, so that there may be no danger of dirt or trash in the aisle falling into the lower berth space.

The upwardly swung floor panels 5 and 50 constitute end partitions for the lower berth space. To enclose the ends of the upper berth space the partitions 8 may be provided, and these may conveniently be stored in the space beneath the floor panels 5 and 50. Any suitable means of supporting them in place may be arranged. As shown, the curved upper wall 90 is provided with a similarly curved track or channel 98, and the partition 8 is provided with a similarly curved and shaped interlocking edge 80, whereby it may be received in this channel 98 and locked therein by sliding it lengthwise of the channel or track, so that in final position it completes with the panels 5 or 50 the end partitions of the section.

Various details of the arrangement shown and described are susceptible of being changed, and are shown only to illustrate an arrangement which is practicable, and other details are omitted. For example, the cushioning of the seat cushions and backs is not shown, but would be such as would render them suitable for use in reversible seats, and for a sleeping berth. Locking and adjusting means have not been shown, since per se they form no essential part of my invention, and their provision represents mere engineering detail. The manner of supporting the seat cushion for removal, as shown, is illustrative only, and any suitable arrangement for the purpose may be substituted for that shown. It will be understood that such details may well be changed without departing from the spirit of my invention.

What I claim as my invention is:

1. An airplane sleeping berth arrangement comprising, in combination with two complemental floor panels of substantially equal length hingedly mounted at their distant edges to swing upwardly to give access to a storage and berth space therebeneath, a pair of facing seats each including a removable seat cushion, a seat back, and means to support the seat cushion above the floor level, for removal and positioning within said storage and berth space as part of a lower berth therein, two arms, each swingably mounted at one end adjacent the floor level and substantially halfway between the hinged and swinging edges of the corresponding floor panel, each seat back being swingably supported adjacent its upper end by the upper end of the corresponding arm, releasable means interengageable between each such arm and seat back to limit relative swinging of the lower end of the back, the two backs, when the seat cushions are removed and the arms swung towards each other, being swingable upwardly into abutting coplanar elevated positions, and means interengageable between said backs, when thus elevated, and the floor panels, when swung upwardly, for mutual support in such positions, to form an upper berth.

2. An airplane sleeping berth arrangement comprising, in combination with a seat including a seat back, a floor panel hingedly mounted along an edge parallel to the width of the seat and beneath the seat back, to swing upwardly into an upright position, said seat including means supporting the upper edge of the seat back for swinging movement of its lower edge about an axis disposed at about the level of the upwardly swung edge of the corresponding floor panel, and at a point distant from the latter, and means interengageable between the swinging edges of the seat back and the floor panel to support both in such upwardly swung position, to constitute part of an upper berth.

3. The combination of claim 2, wherein the latter means are mutually formed and arranged for engagement by downward movement of the swinging edge of the seat back, to prevent accidental disengagement thereof.

4. An airplane sleeping berth arrangement for installation in an airplane cabin including a side wall and an upper wall formed on a curve of large radius, comprising two facing seats supported adjacent the side wall, two floor panels having abutting edges, disposed each beneath one of said seats, and each hingedly mounted along its distant edges to swing upwardly to define the end partition of a lower berth space, each seat including a seat back and means supporting the upper edge of such back for swinging movement of its lower edge about an axis disposed at about the level of the upwardly swung edge of the floor panel, and distant therefrom, means interengageable between the upwardly swung lower edge of each seat back and the upwardly swung edge of its floor panel to support both in such upwardly swung position, the upper edges of the two seat backs, in such position, abutting in coplanar relation to constitute an upper berth, a track formed on the curved upper wall of the cabin, at each end of such upper berth, and a partition having an edge curved to be received in each such track to constitute the end partitions of the upper berth space.

5. An airplane sleeping berth arrangement comprising, in combination, a seat having a back normally extending upwardly from the rear edge thereof, means defining a pivot axis for the upper edge of said back, adapted for disposition in one position substantially over the front edge of said seat, and when thus located guiding the lower edge of said back for swinging movement rearwardly and upwardly to a position substantially over the rear edge of the seat and level with the upper back edge, and means to support the lower back edge in its upwardly swung position.

6. An airplane sleeping berth arrangement, comprising, in combination, two adjacent seats, each including a seat back, an upwardly extending arm for each seat back supported from the airplane structure, a pivot member fixed upon the upper end of each said arm and directly engaging the upper edge of its respective seat back, guiding the free lower edge of said seat back for swinging movement upward about said pivot member, to dispose each back in horizontal position and the backs of the two seats in abutting, coplanar relation, and means to support the swinging lower edge of each seat back in such elevated position.

7. An airplane sleeping berth arrangement comprising, in combination, a seat including a seat cushion and a back movable from its normal position into a horizontal elevated position above the normal position of the seat cushion, an arm pivotally secured at its lower end to the airplane structure, to swing from a normal upwardly and rearwardly inclined position to an upwardly and forwardly inclined position, and in the latter position supportingly engaging one edge of the back in elevated position, and means adjacent the normal position of the back's upper edge to support the opposite edge of the back in such elevated position.

8. An airplane sleeping berth arrangement comprising, in combination, a pair of adjacent seats each including a seat back, an arm for each back fixedly pivoted by its lower end to the airplane structure and fixedly pivoted by its upper end to the upper edge of its seat back, to support and guide the back for upward swinging movement of its lower edge about an axis at the upper edge of the seat back, the two seat backs when thus swung upwardly lying in abutting coplanar elevated relation, to constitute an upper berth, and means to support their lower edges in such upwardly swung position.

9. An airplane sleeping berth arrangement comprising, in combination, a pair of facing seats each including a seat back, two arms, one for each seat back, swingably connected by their upper ends to the upper edges of their respective seat backs, and fixedly pivoted by their lower ends to the air plane structure to swing about said latter pivots from their normal position, wherein they diverge upwardly, to an upwardly converging position with their upper ends adjacent and lying substantially midway between the seats, said upper arm end pivots guiding the seat backs thereafter for upward swinging of their lower free edges, to dispose the two seat backs in elevated, coplanar, horizontal, edge-abutting relationship, and means to support the normally lower edges of the seat backs in such upwardly swung position.

10. An airplane sleeping berth arrangement comprising, in combination, a pair of adjacent seats, each including a seat back, a support for each seat back supported from the airplane structure and pivotally connected to the upper edge of its seat back, to support and guide the seat backs for upward swinging movement of their lower edges to dispose the seat backs in edge-abutting, elevated, coplanar relation, two floor panels substantially equal in length and disposed within the side edges of the seats, and hinge means along the remote edges of the two panels to guide them for swinging into upright positions beneath and for engagement with the upwardly swung edges of the seat backs to support the latter in berth-forming position.

11. An airplane sleeping berth arrangement comprising, in combination with two complemental floor panels of substantially equal length hingedly mounted at their distant edges to swing upwardly, a pair of facing seats each including a seat back, two arms, each swingably mounted at one end adjacent the floor level and substantially halfway between the hinged and swinging edges of the corresponding floor panel, each seat back being swingably supported adjacent its upper end by the upper end of the corresponding arm, the two backs, when the arms are swung towards each other, being swingable upwardly into abutting coplanar elevated positions, and means inter-engageable between said backs, when thus elevated, and the floor panels, when swung upwardly, for mutual support in such positions, to form an upper berth.

12. An airplane sleeping berth arrangement comprising, in combination, a pair of seats, each including a reversible seat back, an arm for each seat back swingably connected at its upper end to the upper edge of its seat back and mounted at its lower end on a fixed pivot adjacent the floor, for swinging about said pivot in reversing the seat back, and stop means releasably engageable between the back and arm to limit relative swinging of the two, the two seat backs, when the upper ends of the two arms have been swung into adjacent positions, to abut the upper edges of the seat backs, and when said stop means have been released, being swingable upwardly on the respective arms into abutting coplanar elevated positions, and releasable means to support the lower edges of the backs in such positions to constitute an upper berth.

13. An airplane sleeping berth arrangement, comprising, in combination, means defining a recessed berth space disposed below the floor level, two complemental, adjoining floor panels of an aggregate size to fit over and cover said berth space, and hinge means along the remote edges of said floor panels, guiding the adjoining floor panel edges for upward swinging movement to dispose the panels in upright position to define end partitions of the berth space.

FRANK R. CANNEY.